(12) United States Patent
Pedersen

(10) Patent No.: US 8,657,323 B2
(45) Date of Patent: Feb. 25, 2014

(54) TRANSPORT SYSTEM

(75) Inventor: Gunnar K. Storgaard Pedersen, Skjern (DK)

(73) Assignee: Vestas Wind Systems A/S, Aarhus N. (DK)

(*) Notice: Subject to any disclaimer, the term of this patent is extended or adjusted under 35 U.S.C. 154(b) by 172 days.

(21) Appl. No.: 13/133,063

(22) PCT Filed: Dec. 8, 2009

(86) PCT No.: PCT/DK2009/050323
§ 371 (c)(1),
(2), (4) Date: Jul. 8, 2011

(87) PCT Pub. No.: WO2010/066255
PCT Pub. Date: Jun. 17, 2010

(65) Prior Publication Data
US 2011/0260428 A1   Oct. 27, 2011

(30) Foreign Application Priority Data
Dec. 9, 2008  (DK) .................................. 2008 01743

(51) Int. Cl.
*B62D 53/04* (2006.01)
(52) U.S. Cl.
USPC .................... 280/406.1; 280/404; 414/458
(58) Field of Classification Search
USPC ....... 280/476.1; 52/745.02; 410/53; 414/458, 414/373
See application file for complete search history.

(56) References Cited

U.S. PATENT DOCUMENTS

| | | | |
|---|---|---|---|
| 3,702,661 A | 11/1972 | Berry, Jr. | |
| 3,913,933 A * | 10/1975 | Visser et al. | 280/656 |
| 6,969,104 B2 * | 11/2005 | Green | 296/26.09 |

FOREIGN PATENT DOCUMENTS

| | | |
|---|---|---|
| DE | 1 234 543 | 2/1967 |
| EP | 0 990 557 | 4/2000 |
| EP | 1 053 930 | 11/2000 |
| EP | 1426274 A1 | 6/2004 |
| EP | 1 488 990 | 12/2004 |
| JP | 60-229835 | 11/1985 |

OTHER PUBLICATIONS

Andras Szaip; International Search Report and Written Opinion issued in priority International Application No. PCT/DK2009/050323; Feb. 3, 2010; 9 pages; European Patent Office.

(Continued)

*Primary Examiner* — Tony Winner
*Assistant Examiner* — Jacob Knutson
(74) *Attorney, Agent, or Firm* — Wood, Herron & Evans, LLP

(57) ABSTRACT

The present invention relates to a transport system for transporting a large element having a longitudinal extension, such as a wind turbine nacelle. The transport system comprises a transport means having a first and a second transport unit, a base structure having a first and a second side and being adapted for supporting and connecting with the large element to be transported, and transport equipment having a first part adapted to be connected to the first side of the base structure and to the first transport unit and a second part adapted to be connected to the second transport unit. The first part engages with the second part. The invention also relates to a transport method.

19 Claims, 8 Drawing Sheets

(56) References Cited

OTHER PUBLICATIONS

Andras Szaip; International Preliminary Report on Patentability issued in priority International Application No. PCT/DK2009/050323; Jun. 14, 2011; 7 pages; The International Bureau of WIPO.

European Patent Office, Communication issued in corresponding EP Application No. 09771494.3-1268 dated Feb. 8, 2013, 4 pages.

* cited by examiner

TRANSPORT SYSTEM

FIELD OF THE INVENTION

The present invention relates to a transport system for transporting a large element having a longitudinal extension, such as a wind turbine nacelle. The transport system comprises a transport means having a first and a second transport unit, a base structure having a first and a second side and being adapted for supporting and connecting with the large element to be transported, and transport equipment having a first part adapted to be connected to the first side of the base structure and to the first transport unit, and a second part adapted to be connected to the second transport unit. Furthermore, the invention relates to a transport method.

BACKGROUND ART

When transporting large elements on a truck, special transport equipment is needed in order to adjust the truck to suit the particular element to be transported. Furthermore, national regulations of a country or a state may require that the transport not exceed a certain height or a certain weight.

In many countries in Europe, a certain overall height has been specified, which a truck including an element may not exceed. In order to comply with these regulations, special transport equipment, which enable the element to be transported on a platform lowered down between a front part of a truck and a rear part of a truck, may be required.

A transport solution where a platform has been lowered down between a front part of a truck and a rear part of a truck is disclosed in EP 1 053 930.

When transporting a large element, such as a wind turbine nacelle, the nacelle is transported on a transport platform during production. Subsequently, a fork on the front part of the truck engages with a front of the platform by inserting the forks into corresponding holes in the platform and, similarly, a fork on the rear part of the truck engages with a rear of the platform via corresponding holes in the rear of the platform.

Such large transport platforms are very difficult to handle during production, but are needed for support of the nacelle during transport, as the front and the rear part of the truck have been parted from each other in order to make room for the nacelle in between them. Thus, an alternative solution is needed which is easier to handle during production and which still aids the transport, since part of some nacelles are fragile and these nacelles thus cannot be lifted in their ends only, thus making transport very difficult.

Furthermore, the transport platforms are so long that the free space needed around a transport platform in order for the platform to be engaged by forks is 6-10 m, which is a lot in a production site.

The transport platforms are also very expensive, and even though they can be reused again and again, the transport platforms are often not returned to the production site until approximately 10 months after the nacelle has reached its destination. One reason for this may be that transport of the platform back to the production site in many countries requires an accompanying car, and thus in itself is expensive.

SUMMARY OF THE INVENTION

An object of the present invention is, at least partly, to overcome the above disadvantages and drawbacks of the prior art and to provide an improved transport system for transport of, for example, a wind turbine nacelle.

The above object, together with numerous other objects, advantages, and features, which will become evident from the below description, is accomplished by a solution in accordance with the present invention by a transport system for transporting a large element having a longitudinal extension, such as a wind turbine nacelle, comprising
  a transport means having a first and a second transport unit,
  a base structure having a first and a second side and being adapted for supporting and connecting with the large element to be transported, and
  transport equipment having:
    a first part adapted to be connected with the first side of the base structure and to the first transport unit, and
    a second part adapted to be connected with the second transport unit, wherein the first part engages with the second part.

In prior solutions, the base structure was adapted to support the large element over the wide gap in between a front part and a rear part of a truck. By having transport equipment with a first part engaging with a second part, the base structure can be made much smaller since the transport equipment extends over the entire span between the first and second wheel unit of the truck. It is hereby obtained that the base structure can be made smaller than in the solutions of prior art, and thus less expensive.

Furthermore, the base structure is easier to handle at the production site since the reduced size also reduces the space needed around it in order for a transport unit to engage with it. The transport at the production site can also be handled by only one transport unit. In prior art solutions, two transport units were needed since the initial engagement of the platform structure required insertion of a set of forks into each end of the platform structure.

In addition, the base structure can be made as a frame structure and no longer has to be a platform.

In one embodiment, the first part may have at least two elongated arms each having an at least partly hollow structure enabling them to receive corresponding arms of the second part for engagement with the second part.

By having a second part which is inserted into a hollow structure, the engagement between the first and the second part locks the second part within the first part in both the vertical and the horizontal direction of the truck.

In addition, the first part may comprise a flange along each of the elongated arms, and the base structure may be supported by the flanges when the first part is connected with the base structure.

By having a flange, the base structure can easily be connected to the first part of the transport equipment, and the base structure can slide onto the first part if needed.

Furthermore, the first part has a locking means for locking the base structure to prevent it from departing from the first part during transport.

In one embodiment, the second part may have a locking means for locking the base structure to prevent it from departing from the second part during transport.

During transport, the truck has to stop and start several times, so it is very important that the transport system is not disengaged during such longitudinal movements.

By fastening the base structure to the first and the second part, the base structure functions as an intermediate locking part of the first and the second part so that additional locking means is not needed for locking the first part to the second part. Furthermore, the locking of the first part to the second part occurs when connecting the base structure, and a subsequent mounting process is thus not needed either.

In one embodiment, the locking means may be a mechanical lock engaging the first part and the base structure and/or the second part and the base structure.

In another embodiment, the locking means for locking the base structure may be a bolt penetrating the first part, the second part, and the base structure.

By using a bolt, such as a pin bolt, a tested safety means is used which is easy to mount and dismount.

In another embodiment, the locking means may be a mechanical lock engaging the base structure for hindering any movements of the base structure in the longitudinal extension of the element.

In this case, the locking process occurs when sliding the base structure to abut the locking means of the first or the second part.

In yet another embodiment, the locking means may comprise means for locking the base structure in a direction perpendicular to the longitudinal extension of the element.

This prevents the base structure from tilting during transport if, for example, the truck drives over a bump on the road.

According to the invention, the first part and the second part may be locked in relation to each other when engaged.

Furthermore, the transport equipment may have a longitudinal extension when the first part and the second part are engaged and a length of the longitudinal extension of the transport equipment is longer than 105% of the longitudinal extension of the large element, preferably longer than 110%, even more preferably longer than 125% of the longitudinal extension of the large element. It is ensured that, when the arms of the first part and the second part engage, the arms have an overall length longer than that of the large element.

Also, according to the invention, the transport equipment may be adapted to be fastened to a standard connection of a truck.

Furthermore, the arms of the first and second part of the equipment may be lower than a highest point of wheels of the wheel units when fastened to the wheel units.

According to an embodiment of the invention, the base structure may be a frame structure.

In this case, the construction of the base structure can be very strong, and additional parts may easily be mounted thereon.

In addition, the base structure may be made of any kind of steel.

Due to the fact that the span of the base structure has been reduced markedly, the base structure can be made from any kind of steel, and does not necessarily have to be made from expensive high-strength steel.

In another embodiment, the base structure may have a length less than the longitudinal extension of the large element, preferably less than 80%, more preferably less than 70% and even more preferably less than 60%.

Due to the fact that the span of the base structure has been reduced markedly, the base structure can be made having a length smaller than that of the element which it is carrying.

Furthermore, according to the invention, the base structure may have means for fastening a nacelle.

When the base structure has means for fastening a nacelle, no additional equipment is needed for fastening the nacelle other than bolts or the like fastening means.

Also, the first and the second part of the transport equipment may be manufactured pre-stressed.

When the transport system is loaded with the large element, the first and the second part may have a deflection. But when the first and the second part of the transport equipment have been manufactured in a pre-stressed condition, the deflection caused by the load evens out the pre-stressed material of the transport equipment, and the arms of the first and the second part are straightened out. In this way, the first and the second part of the transport equipment can be manufactured in a pre-stressed condition corresponding to the deflection coming from the load of a large element to be transported.

In yet another embodiment, the second part of the transport equipment may have an I-shaped cross-section, like, for example, an I-shaped girder.

Due to the fact that the transport equipment is designed as a first part engaging with a second part for supporting the base structure, the first and the second part of the transport equipment can be made from standard beams having a standard profile. In this way, the cost of making the transport system is reduced to at least ¼ of the cost of making a prior art platform structure.

In addition, a nacelle may have means for fastening the nacelle to a tower of a wind turbine, and the means of the nacelle may be used for fastening the nacelle to the base structure.

Thus, the base structure may have means for fastening of the base structure to a tower connection of the nacelle.

In addition, the invention relates to transport equipment as described above.

The invention also relates to a base structure as described above.

Finally, the invention also relates to a transport method using the transport system as described above, comprising the steps of:
  connecting the first part to the first transport unit,
  connecting the second part to the second transport unit,
  moving the arms of the first part under the base structure,
  moving the arms of the second part to engage with the first part, and
  raising the first part engaged with the second part to connect to the base structure and raise the base structure.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF THE INVENTION

A transport system 1 according to the invention is mainly used to transport large and heavy elements 2, such as a wind turbine nacelle. In the following, the transport system 1 will be described in relation to a wind turbine nacelle; however, the large element 2 may be any kind of large element, such as parts of a boat or other parts of a wind turbine. When transporting a wind turbine nacelle, the nacelle is too high to pass through a number of tunnels and under a number of bridges, and the nacelle thus has to be transported in a lowered position, which is usually done by placing the nacelle on a platform structure lowered between a front part and a rear part of a truck. Thus, this platform structure has to uphold the weight of the wind turbine nacelle as well as its own weight and, since the nacelle is very large, the platform structure has to uphold this weight over a wide span.

Figure 1:
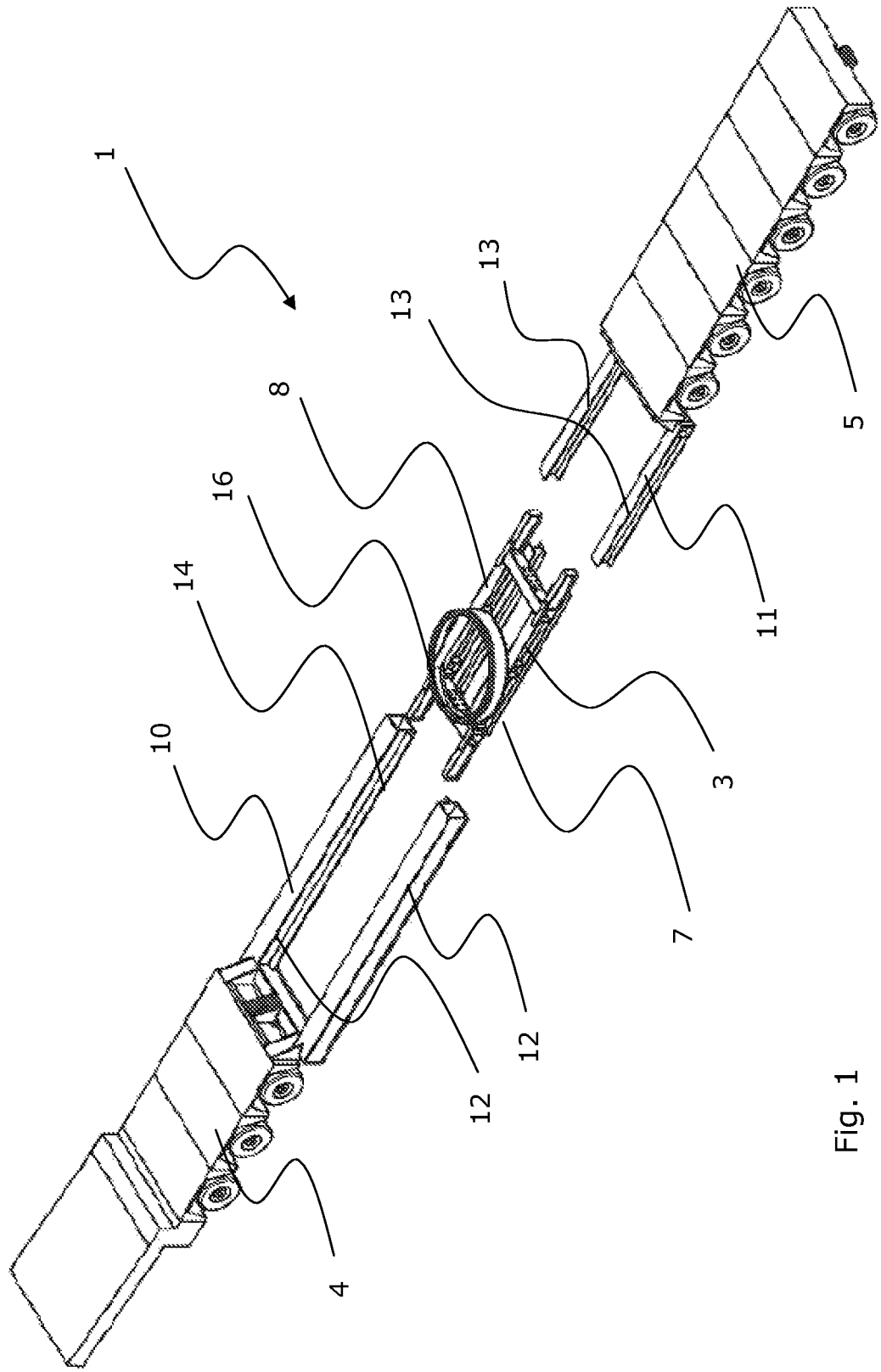
FIG. 1 shows a transport system according to the present invention in its unmounted state.
Figure 3:
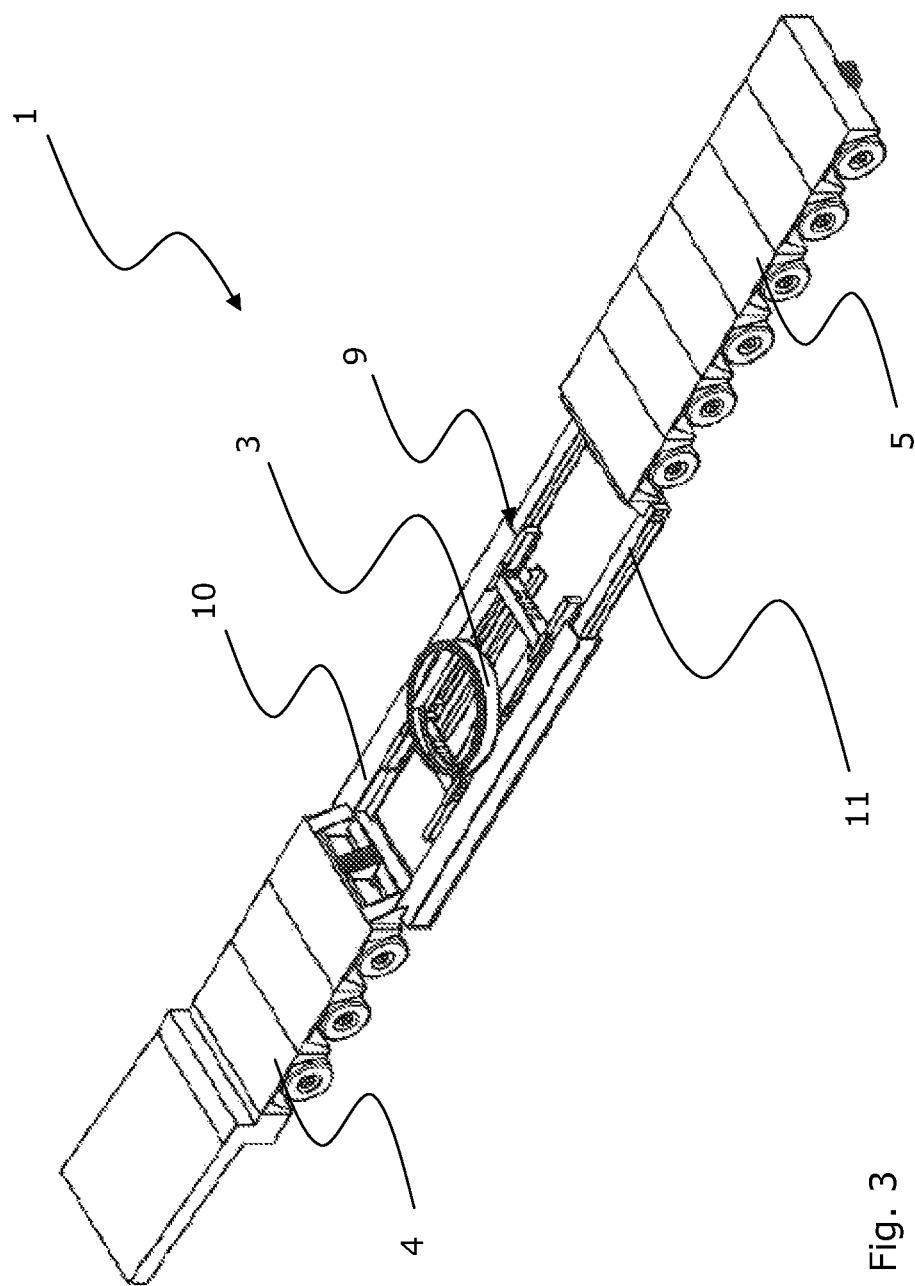
FIG. 3 shows the transport system of FIG. 1 in a partly mounted state.

In FIG. 1, a transport system 1 according to the invention is shown in its unmounted state. The transport system 1 comprises a transport means having a first 4 and a second 5 transport unit, such as a front and a rear part in the form of the wheel units of a truck. Furthermore, the transport system 1 has transport equipment 9 having a first part 10 adapted to be connected to the first transport wheel unit 4, and a second part 11 adapted to be connected to the second transport wheel unit 5. In one end, the first and the second part 10, 11 are fastened to each their wheel unit 4, 5 and, in the other end, they are connected to each other. As shown in FIG. 3, a base structure onto which the nacelle may be fastened is positioned on the first 10 and thus the second part 11.

By having transport equipment 9 with a first part 10 which engages with a second part 11, the base structure 3 can be made much smaller than in the solutions of prior art, since the transport equipment extend over the wide span between the first 4 and the second wheel unit 5 of the truck. When the base structure 3 is made smaller, it also becomes less expensive.

Furthermore, the base structure 3 is easier to handle at the production site since the reduced size also reduces the space needed around it in order for a transport unit to engage it. Transport at the production site can also be handled by only one transport unit. In prior art solutions, two transport units were needed since the initial engagement of the platform structure required insertion of a set of forks into each end of the platform structure. In addition, the base structure 3 can be made as a frame structure, or in another design, and thus no longer has to be a platform with hollow sections.

Also, the transport equipment 9 may be used during transport of other large elements 2 as it does not have a special fastening means, such as the cylindrical flange. The transport equipment 9 may thus be used in connection with other types of base structures 3 for transport of a variety of large elements 2.

As shown in FIG. 1, the first part 10 has a first set of arms 12, and the second part 11 has a second set of arms 13. Even though the parts are only shown as having two arms, the number of arms may be different in another embodiment.

The arms 12 of the first part 10 have an elongated shape and extend out from the wheel unit 4 to which they are connected. In this way, each of the parts 10, 11 of the transport equipment 9 is upheld alone by the wheel unit 4, 5, the weight of the wheel unit acting as a counterweight. The first 10 and the second part 11 are adapted to engage with each other and to be connected to a base structure 3 on which the wind turbine nacelle is fastened. The first part 10 has flanges provided along part of its longitudinal extension. The connection between the first part 10 and the base structure 3 is facilitated by a first side 7 of the base structure being supported by one flange of one arm and a second, opposing side 8 of the base structure being supported by another flange of the other arm. Thus, together, the first part 10, the second part 11, and the base structure 3 constitute a platform structure for carrying a large element 2, such as a wind turbine nacelle.

The base structure 3 is adapted for connection to the large element 2 to be transported. When transporting a wind turbine nacelle, the fastening connection of the nacelle which is to be connected to the tower of a wind turbine is used for fastening of the nacelle to the base structure. Thus, the base structure has connecting means 16 for connecting to the large element, which in this embodiment is a cylindrical flange 16.

Some wind turbine nacelles are not self-supporting, meaning that part of the nacelle is fragile. Accordingly, transport of the nacelle cannot take place just by grapping each end of the nacelle, since the nacelle would then be destroyed. To avoid this, the nacelle must be fastened in its tower connection. The cylindrical flange 16 usually has holes through which fastening means penetrate for fastening to the tower connection.

In FIG. 1, the first part 10 of the equipment 9 is mounted onto a first wheel unit 4 of a truck, and the second part 11 is mounted onto a second wheel unit 5. The first 10 and second part 11 are made to fit a certain standard system on a truck. It should be noted that the first part is not shown connected to the cab of a truck. Even though the first part 10 is shown mounted onto a front wheel unit of a truck, the second part 11 could be mounted onto the front wheel unit and the first part onto the rear wheel unit in another embodiment.

Figure 2:
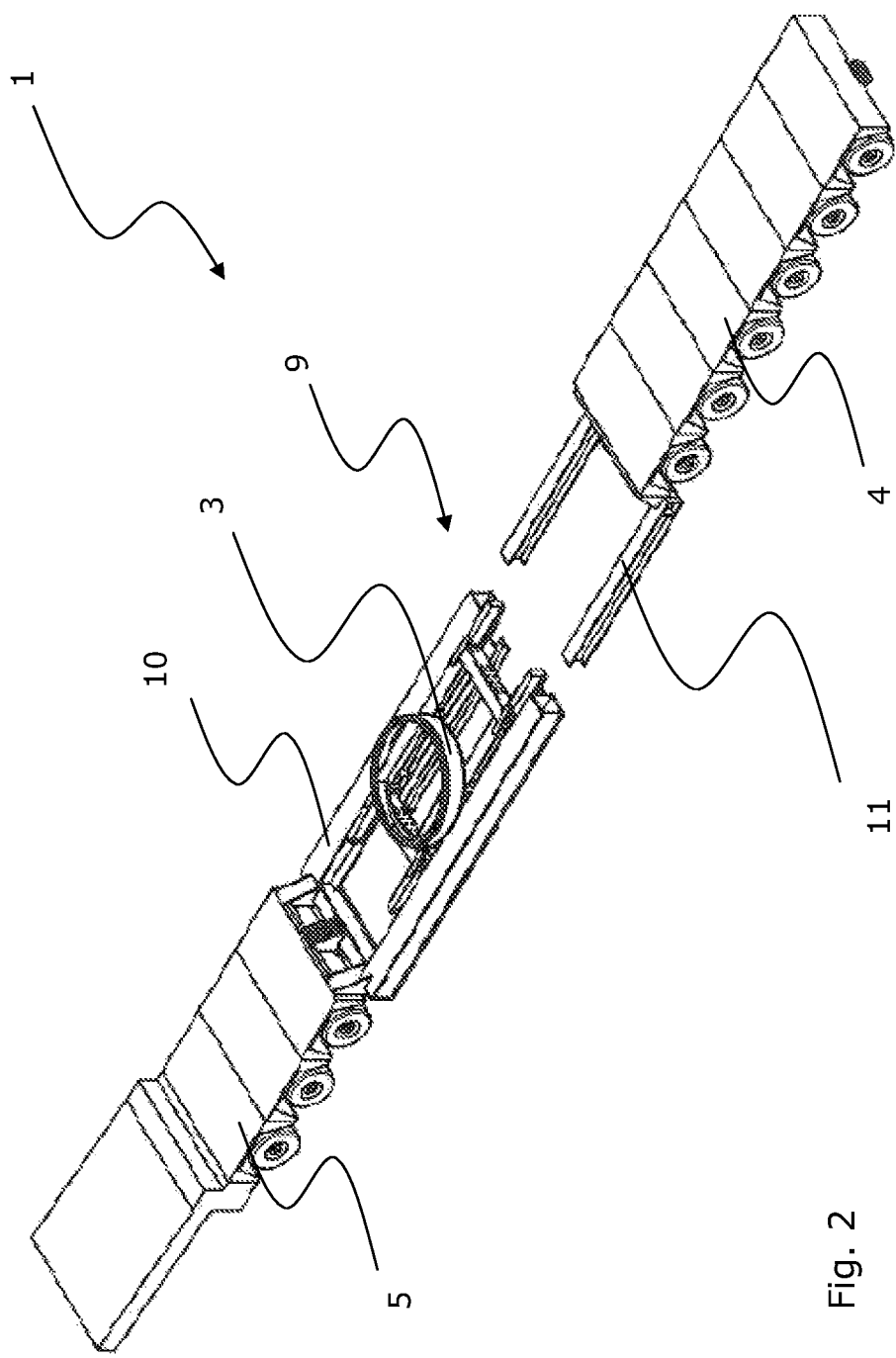
FIG. 2 shows the transport system of FIG. 1 in a partly mounted state.

When mounting the transport system 1 in preparation for transport of a large element 2, such as a wind turbine nacelle, the first part 10 is led in under the base structure 3 which is lifted somewhat off the ground. In this position, as shown in FIG. 2, the sides 7, 8 of the base structure 3 do not abut the flanges of the first part 10.

In FIG. 3, the second part 11 of the equipment 9 is moved by moving the second wheel unit 5. In this way, the arms of the second part 11 engage with the arms of the first part 10, in that the arms of the first part are hollow and the arms of the second part are inserted into the hollow cavity of the arms of the first part. In this position, neither the first 10 nor the second part 11 abut the sides of the base structure 3.

Figure 4:
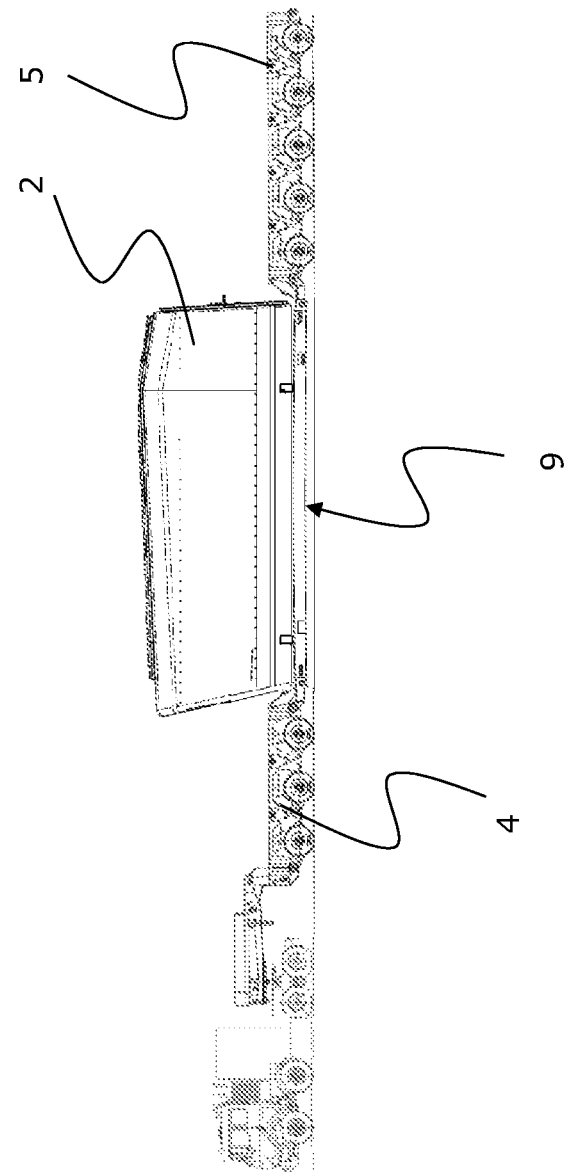
FIG. 4 shows the transport system of FIG. 1 in its mounted state, FIG. 4*a* schematically shows various locking arrangements for the transport system.

The transport system 1 is shown in its mounted position in FIG. 4. The wind turbine nacelle is fastened to the base structure 3, and the first 10 and the second part 11 are fully engaged. After engagement, the transport equipment 9 has been lifted so that the flanges of the first part 10 support the sides 7, 8 of the base structure 3. Thus, the first part 10, the second part 11, and the base structure 3 uphold the nacelle and the transport system 1 is ready for transport. The transport system 1 is connected to a truck; however, the truck may be replaced by another suitable transport means.

Figure 4A:
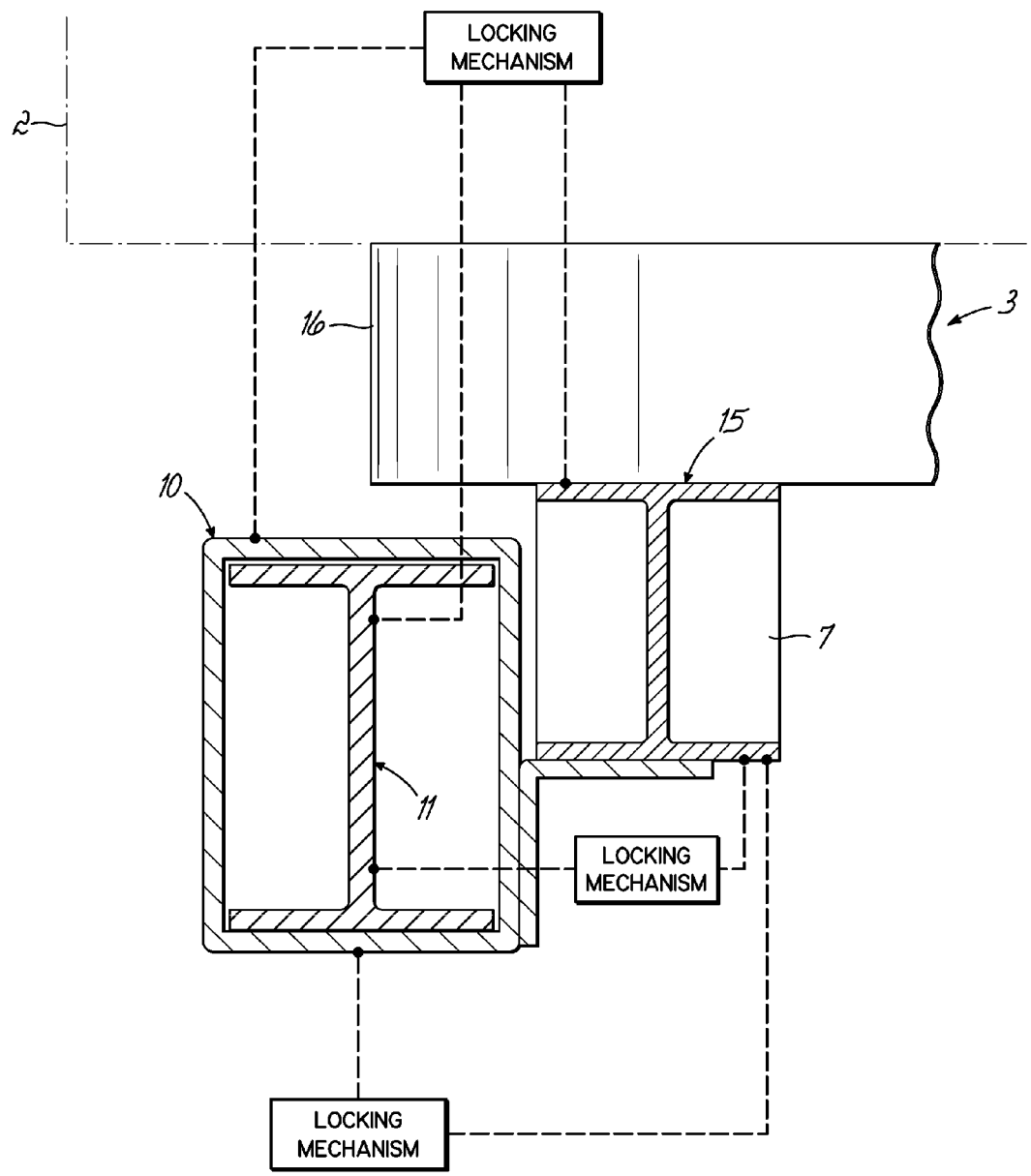

The second part 11 is inserted into the hollow structure of the first part 10, and the first and the second part are subsequently interlocked. In one embodiment, fastening means, such as a bolt, for example, a pin bolt, penetrates the first 10 and the second part 11 in order to interlock the parts in relation to each other. In another embodiment, the base structure 3 is fastened to the transport equipment 9 by means of a bolt penetrating both arms of the parts 10, 11 and the base structure. This arrangement is schematically illustrated in FIG. 4a.

In yet another embodiment, locking means positioned on the first 10 and the second part 11, respectively, lock the base structure 3 to the first and the second part, respectively. This arrangement is also schematically illustrated in FIG. 4a. In this way, the base structure 3 is used as an intermediate locking part, locking movements of the first part 10 in relation to the second part 11. The locking means locks the base structure 3 to the first part 10 or the second part 11 by means of a mechanical lock, such as a snap-lock, meaning that a locking arm is activated by the base structure when the end of the base structure abuts the locking means. The locking arms engage in a cavity in the base structure 3, and the base structure is locked in a longitudinal direction of the transport system 1. In order to lock the base structure 3 also in a direction perpendicular to the longitudinal direction of the transport system 1, the locking means also has a flange or the like means projecting above the base structure.

Figure 5:
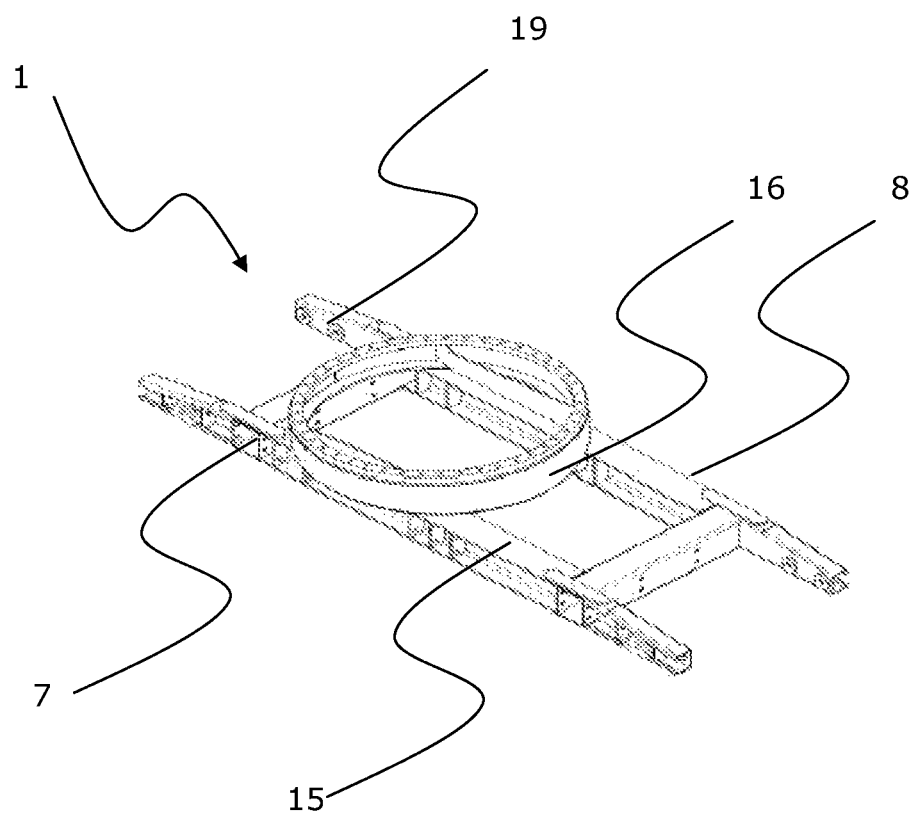
FIG. 5 shows an embodiment of the base structure according to the invention.

In FIG. 5, the base structure has a frame structure 15 and a connection means 16 for fastening of the wind turbine nacelle. The frame structure 15 is a square-shaped frame made from I-shaped profiles. In another embodiment, however, the frame can be made from other kinds of profiles, such as U-shaped profiles or profiles having a square cross-section. The square-shaped frame structure 15 is in each corner provided with a projecting part 19 adapted to engage the locking means of the first 10 and second part 11, respectively. Thus, the projecting parts 19 have a cavity for mechanically locking, for example, snap-locking, with the parts 10, 11. The projecting parts 19 taper from the square-shaped frame 15 towards the first 10 or the second part 11 in order to guide the base structure 3 onto the flange of the first part.

The projecting parts 19 may have any kind of shape so as to conform to the locking means of the first 10 and second part 11 of the transport equipment 9.

The base structure 3 is fastened to the wind turbine nacelle during production of the nacelle and follows the nacelle during mounting of all the parts in the nacelle. In order to move the nacelle from one production place to another, a transport device is lowered under the base structure. When the transport device, now positioned at least partly under the base structure 3, is raised, the nacelle can be moved. Due to the fact that the base structure 3 is much smaller than in the solutions of prior art, only one transport device is needed. Furthermore, the transport device can be a simpler device which only has to be able to raise the base structure and thus the nacelle from the ground. It does not need to have a counter-weight, which was the case with the solutions of prior art.

The cylindrical flange 16 for connecting to the nacelle corresponds to the connection means of the wind turbine tower, and the connection is thus made in a position where the wind turbine nacelle is self-supporting.

The base structure 3 may have any kind of shape, for example, by having different kinds of frame structures. In one embodiment, the frame may, for example, have several cross members in order to strengthen the frame construction.

Figure 6:
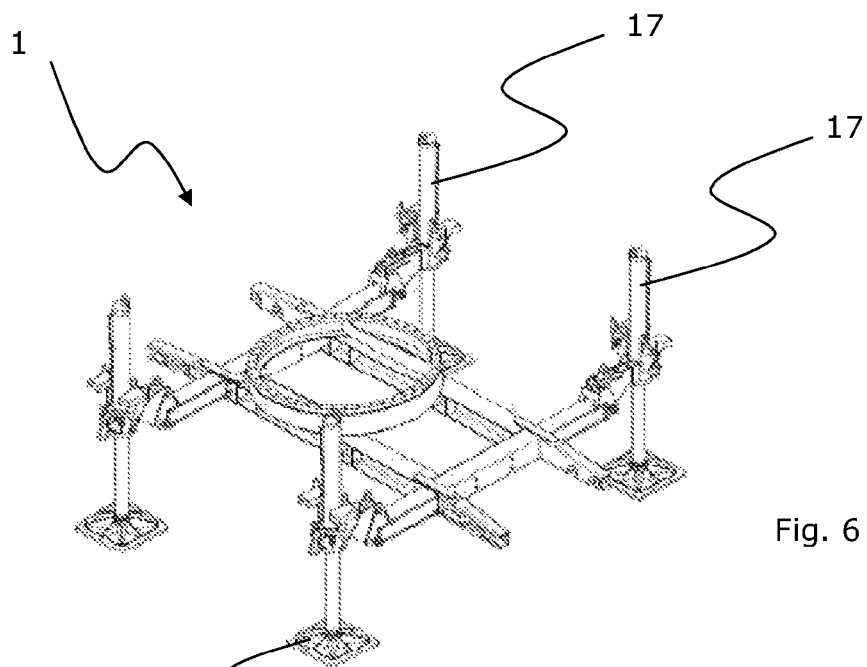
FIG. 6 shows another embodiment of the base structure.

At certain points during production of the nacelle and storing of the finished nacelle, the nacelle needs to be positioned on the ground. In these cases, it is necessary that a transport device or transport equipment 9 can still be lowered under the base structure 3. Thus, the base structure 3 is provided with some kind of supporting means, such as four legs 17 as shown in FIG. 6. The legs 17 are mounted in leg shoes 18 which are typically made from a kind of friction-enhancing material. The legs 17 are mounted onto the frame either directly or by means of extension means to prevent the top of the legs from scraping against the side of the nacelle when the base structure 3 is lowered in relation to the legs.

The supporting means may also be provided in the form of fixed legs which are attached when the frame or base structure is in a lifted position, for example, by having a protruding arm which is inserted into the frame and locked/fixed with a locking pin.

Thus, as an alternative to the lifting system of a truck, the legs 17 can be provided with some adjusting means in order to lower or raise the nacelle on the base structure 3 in relation to the ground. The adjusting means may be some kind of jacking means, such as a jack, jacking cylinders or a hydraulic jack or hydraulic cylinder. By using jacking cylinders, no other lifting or lowering means are necessary, for example, on the truck, and thus, a more simple and often more available truck may be used.

Figure 7:
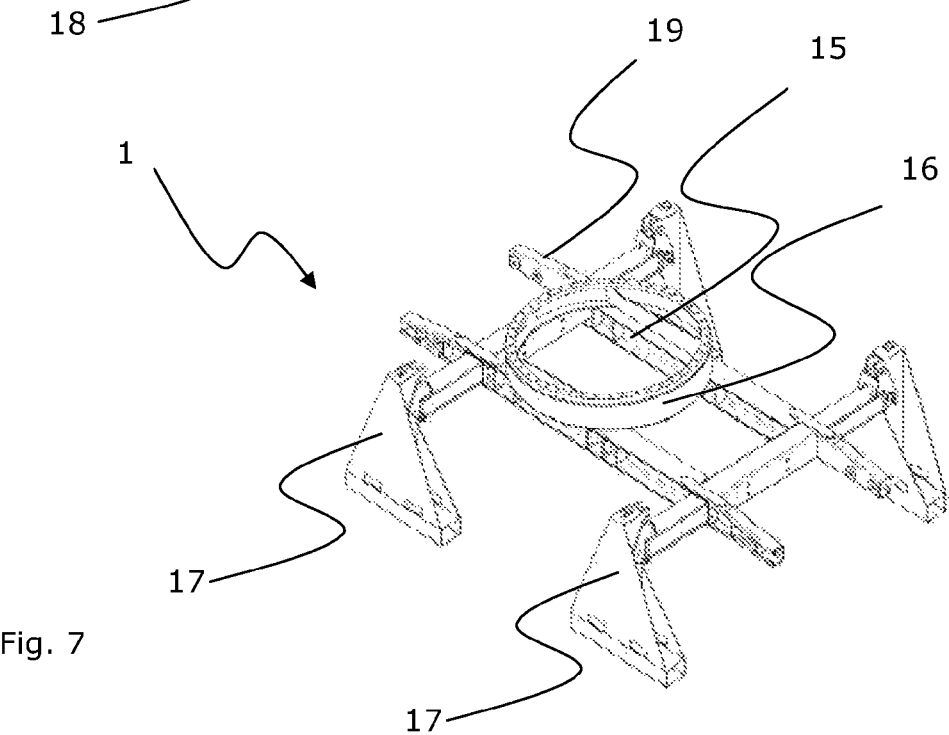
FIG. 7 shows yet another embodiment of the base structure according to the invention.

In another embodiment, the base structure 3 has been provided with some kind of supporting elements, such as triangular shoes, as shown in FIG. 7. In this embodiment, the base structure 3 has also been provided with some extensions so that the nacelle is not damaged.

Thus, as an alternative to the lifting system of a truck, the triangular shoes can be provided with adjusting means to lower or raise the nacelle on the base structure 3 in relation to the ground. The adjusting means may be some kind of jacking means, such as a jack, jacking cylinders or a hydraulic jack, or may comprise some kind of gas springs or hydraulic cylinder.

Figure 8:
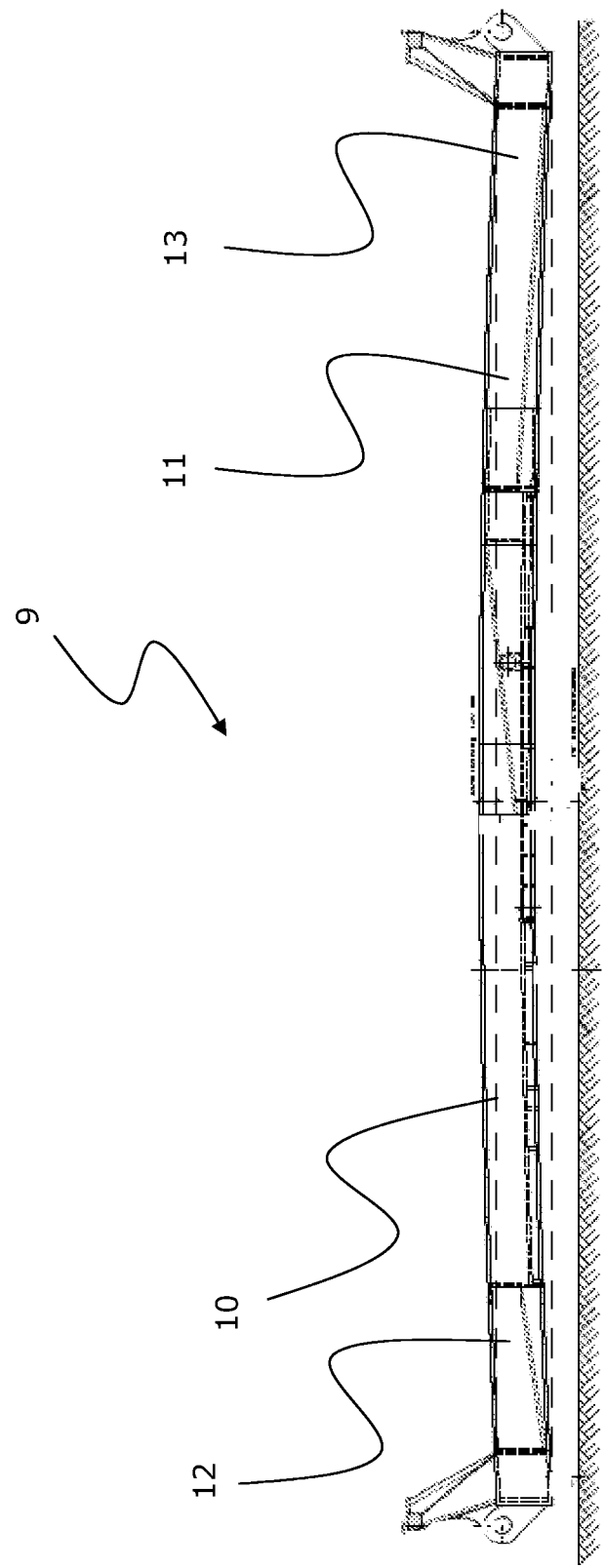
FIG. 8 shows part of the transport equipment according to the invention.

In FIG. 8, transport equipment 9 according to the present invention is shown. The transport equipment 9 is shown when the first 10 and the second part 11 engage by one part being inserted into the other. When the first 10 and the second part 11 engage, the transport equipment 9 forms a bridge from the first transport unit 4 to the second transport unit 5 of, for example, a truck. In order to compensate for the load of the weight from the wind turbine nacelle, arms of the transport equipment 9 have been manufactured in a pre-stressed state. In this way, the deflection caused by the wind turbine nacelle is compensated for. The pre-stressed state is adjusted to the load of the wind turbine nacelle so that the wind turbine nacelle does not project more from the truck than that it is still able to comply with the height regulations for transport of such large elements 2.

As can be seen from FIG. 8, the transport equipment 9 is provided with anchoring means for anchoring to a standard anchoring equipment of a truck where a bolt penetrates openings of the truck and the transport equipment 9 in order to fasten the transport equipment 9 to the transport unit of the truck.

The first 10 and the second part 11 may engage with each other in many ways. In this embodiment, the first part 10 is made from a profile having a square cross-section and the second part 11 from an I-profile able to be inserted into the first part. However, the first part 10 could also have been made from a U-shaped profile, i.e. a profile having a U-shaped cross-section, wherein the second part is to be inserted. The second part 11 could also have been made from an L-shaped profile.

As shown in FIG. 4, the transport equipment 9 has a longitudinal extension when the first part 10 and the second part 11 are engaged, which extension has a length longer than 105% of the longitudinal extension of the large element 2, preferably longer than 110%, even more preferably longer than 125% of the longitudinal extension of the large element. In this way, the nacelle is not damaged by the transport equipment 9 and/or the connections to the wheel units 4, 5 of the truck. The connection of the transport equipment 9 may be any kind of connection matching the standard connection on the truck on which it is to be transported.

The base structure 3 may be made from any kind of steel or any other suitable material. The base structure 3 may be made from different kinds of material suitable for supporting the large element 2, and the connection means of the base structure may, for example, be partly made of another material.

The transport equipment 9 may also be made from any kind of steel. Some parts of the equipment 9 may be made of high-strength steel, such as steel sold under the trade name Weldox 700, whereas other parts may be made from less expensive material in order to save money. Thus, part of the equipment 9 may made from standard profiles, such as an I-profile.

By a wind turbine is meant any kind of apparatus able to convert wind power into electricity, such as a wind generator, wind power unit (WPU), or wind energy converter (WEC). And by a wind turbine nacelle is meant any kind of housing the drive train of the wind turbine, for example, the generator, the gear, etc.

Although the invention has been described above in connection with preferred embodiments of the invention, it will be evident for a person skilled in the art that several modifications are conceivable without departing from the invention as defined by the following claims.

The invention claimed is:

1. A transport system for transporting a large element having a longitudinal extension, comprising:
   a transporter having a first and a second transport unit,
   a base structure having a first and a second side and being adapted for supporting and connecting with the large element to be transported, and
   transport equipment including:
      a first part adapted to be connected with the first side of the base structure and with the first transport unit, and
      a second part adapted to be connected with the second transport unit,
   wherein the first part engages with the second part, and wherein the base structure has a mechanism for fastening a nacelle.

2. The transport system according to claim 1, wherein the first part has at least two elongated arms each having an at least partly hollow structure enabling the at least two elongate arms to receive corresponding arms of the second part for engagement with the second part.

3. The transport system according to claim 2, wherein the first part comprises a flange along each of the elongated arms and the base structure is supported by the flanges when the first part is connected with the base structure.

4. The transport system according to claim 1, wherein the first part has a locking mechanism for locking the base structure to prevent it from departing from the first part during transport.

5. The transport system according to claim 1, wherein the second part has a locking mechanism for locking the base structure to prevent it from departing from the second part during transport.

6. The transport system according to claim 1, wherein the first part has a locking mechanism for locking the base structure to prevent it from departing from the first part during transport, wherein the second part has a locking mechanism for locking the base structure to prevent it from departing from the second part during transport, and wherein the locking mechanism of the first part and of the second part is a mechanical lock engaging the first part and the base structure and the second part and the base structure, respectively.

7. The transport system according to claim 6, wherein the locking mechanism for locking the base structure is a bolt penetrating the first part, the second part, and the base structure.

8. The transport system according to claim 1, wherein the first part and the second part are locked in relation to each other when engaged.

9. The transport system according to claim 1, wherein the transport equipment has a longitudinal extension when the first part and the second part are engaged and a length of the longitudinal extension of the transport equipment is longer than 105% of the longitudinal extension of the large element.

10. The transport system according to claim 1, wherein the base structure is a frame structure.

11. The transport system according to claim 10, wherein the base structure is made of any kind of steel.

12. The transport system according to claim 1, wherein the base structure has a length less than the longitudinal extension of the large element.

13. The transport system according to claim 1, wherein the first and the second part of the transport equipment are manufactured pre-stressed.

14. The transport system according to claim 1, wherein the second part of the transport equipment has an I-shaped cross-section.

15. The transport system according to claim 1, wherein the base structure has a mechanism for fastening the base structure to a tower connection of a nacelle.

16. The transport system according to claim 1, wherein the base structure is provided with supporting means.

17. The transport system according to claim 16, wherein the supporting means comprises an adjusting means comprising at least one jacking mechanism.

18. A transport method comprising:
    providing a transport system that includes:
       a transporter having a first and a second transport unit,
       a base structure having a first and a second side and being adapted for supporting and connecting with the large element to be transported, and
       transport equipment including:
          a first part having arms, the first part adapted to be connected with the first side of the base structure and with the first transport unit, and
          a second part having arms, the second part adapted to be connected with the second transport unit,
       wherein during use of the transport system the first part engages with the second part,
    connecting the first part to the first transport unit,
    connecting the second part to the second transport unit,
    moving the arms of the first part under the base structure,
    moving the arms of the second part to engage with the first part, and
    raising the first part engaged with the second part to connect to the base structure and raise the base structure.

19. A transport system for transporting a large element having a longitudinal extension, comprising:
    a transporter having a first and a second transport unit,
    a base structure having a first and a second side and being adapted for supporting and connecting with the large element to be transported, and
    transport equipment including:
       a first part adapted to be connected with the first side of the base structure and with the first transport unit, and
       a second part adapted to be connected with the second transport unit,
    wherein the base structure is configured to be selectively separable from the first part, wherein the first part engages with the second part, and wherein the base structure has a mechanism for fastening a nacelle.

* * * * *

UNITED STATES PATENT AND TRADEMARK OFFICE
CERTIFICATE OF CORRECTION

PATENT NO. : 8,657,323 B2  Page 1 of 1
APPLICATION NO. : 13/133063
DATED : February 25, 2014
INVENTOR(S) : Gunnar K. Storgaard Pedersen It is certified that error appears in the above-identified patent and that said Letters Patent is hereby corrected as shown below:

On the title page Insert item (60)

--Related U.S. Application Data

(60) Provisional Application No. 61/121,057, filed on December 9, 2008.--

Signed and Sealed this
Eighth Day of July, 2014

Michelle K. Lee
*Deputy Director of the United States Patent and Trademark Office*